UNITED STATES PATENT OFFICE.

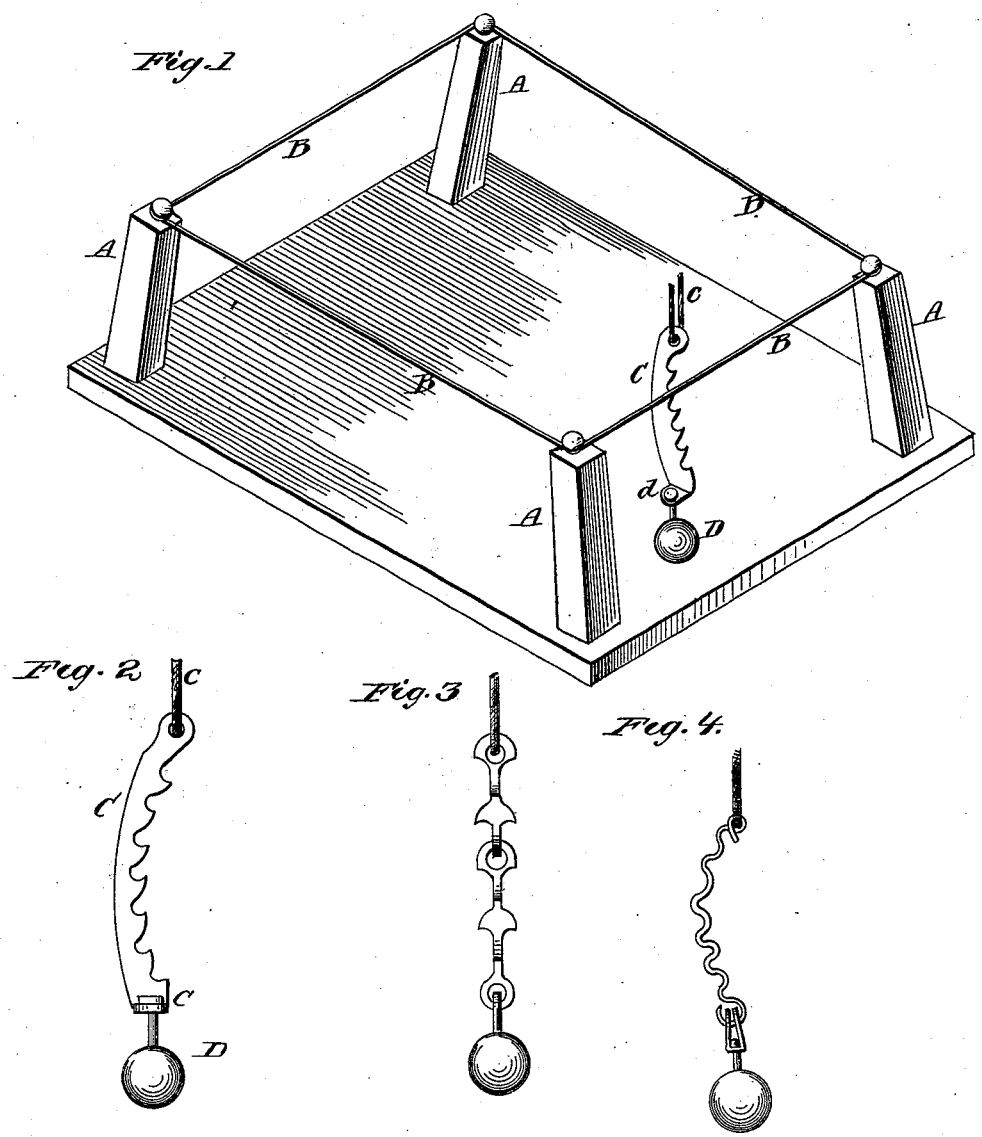

ANDREW HALLNER AND JOHN S. LINDQUIST, OF SWEDEBURG, NEBRASKA.

IMPROVEMENT IN CATTLE-GUARDS.

Specification forming part of Letters Patent No. 207,963, dated September 10, 1878; application filed July 6, 1878.

*To all whom it may concern:*

Be it known that we, ANDREW HALLNER and JOHN S. LINDQUIST, of Swedeburg, in the county of Saunders and State of Nebraska, have invented certain new and useful Improvements in Cattle-Guards; and we do hereby declare that the following is a full, clear, and exact description thereof, which will enable others skilled in the art to which it appertains to make and use the same, reference being had to the accompanying drawings, which form a part of this specification, and in which—

Figure 1 is a perspective view of our improvement as applied for use. Fig. 2 is a detached enlarged view of the catch or fastening and anchor of guard, and Figs. 3 and 4 are modifications of the fastening and anchor.

The same part in the several figures is denoted by the same letter.

This invention appertains to certain improvements in animal or cattle guards to check and turn the animal back upon contact with the fence, and is characteristic for simplicity, quick and easy erection or construction, cheapness of manufacture, and efficiency; and it consists of a curved or segmental toothed plate or catch, connected, in practice, to the animal's neck, and provided with a weight or anchor, substantially as hereinafter more fully set forth.

In the drawing, A A refer to fence-posts, inclining inwardly at an angle of about twenty degrees, and united together by a single wire, B, which wire can be increased in length by connecting thereto additional sections in adapting it to inclosures of greater dimensions, or be shortened in adapting it to inclosures of less dimensions.

The object of inclining the fence-posts is to obviate the catching thereon or upon their lower ends of the anchor or fastening of the guard as the animal approaches or comes in contact with the fence.

C is the fastening plate or catch, consisting, in the main, of a segmental toothed or serrated plate, with its teeth pointing upwardly, but their backs beveled, so as to prevent their hanging or catching on the wire of the fence as the animal backs off from the fence. The pointing of the teeth upwardly causes them to catch on the fence-wire as the animal approaches or comes in contact with the fence, the fastening or catch being connected to the animal's neck by a rope or strap, *c*, and thus halt and cause him to turn and leave the fence without the latter having been injured by such contact.

To the lower end of the fastening or catch is swiveled, as at *d*, an anchor or weight, D, to insure the catching of the fastening on the fence-wire.

From the foregoing it will be observed that this improvement is exceedingly simple, inexpensive, easily and quickly constructed, and effective.

Having thus described our invention, we claim and desire to secure by Letters Patent—

The combination of the curved or segmental toothed plate C with weight or anchor D, and rope, strap, or chain *c*, substantially as and for the purpose specified.

ANDREW HALLNER.
    JOHN S. LINDQUIST.

Witnesses:
 JOHN HALLNER,
 JOHN A. SMITH.